(12) United States Patent  
Pillai

(10) Patent No.: US 6,889,156 B2  
(45) Date of Patent: May 3, 2005

(54) AUTOMATIC TEST SYSTEM FOR AN ANALOG MICROMIRROR DEVICE

(75) Inventor: Narayana Sateesh Pillai, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 19 days.

(21) Appl. No.: 10/318,685

(22) Filed: Dec. 13, 2002

(65) Prior Publication Data

US 2004/0117142 A1 Jun. 17, 2004

(51) Int. Cl.[7] .............................................. G06F 19/00
(52) U.S. Cl. ....................... 702/118; 702/116; 702/117
(58) Field of Search ................................ 702/116, 117, 702/118, 120, 122; 359/290, 291, 295; 356/218, 445

(56) References Cited

U.S. PATENT DOCUMENTS 4,385,830 A * 5/1983 Webb et al. .................. 356/28
6,561,648 B2 * 5/2003 Thomas ...................... 351/221
6,639,711 B2 * 10/2003 Orcutt ........................ 359/291
6,714,336 B2 * 3/2004 Orcutt et al. ............... 359/290

* cited by examiner

Primary Examiner—Bryan Bui  
(74) Attorney, Agent, or Firm—William B. Kempler; W. James Brady, III; Frederick J. Telecky, Jr.

(57) ABSTRACT

An automatic tester for an analog micromirror device includes a computer having an ADC and DAC connected to its peripheral bus. A micromirror device under test is mounted on a black box containing a light source such as a laser and a position sensitive device. The light beam is reflected by the micromirror device onto the position sensitive device so that the deflection of the mirror in two axes can be measured. The output of the position sensitive device is amplified and coupled to the ADC via a tester board. The computer can test the micromirror device to detect mechanical failure and to measure the resonant frequency and Q of the driving coils, and SNR of the internal package feedback which measures the position of the mirror.

20 Claims, 3 Drawing Sheets

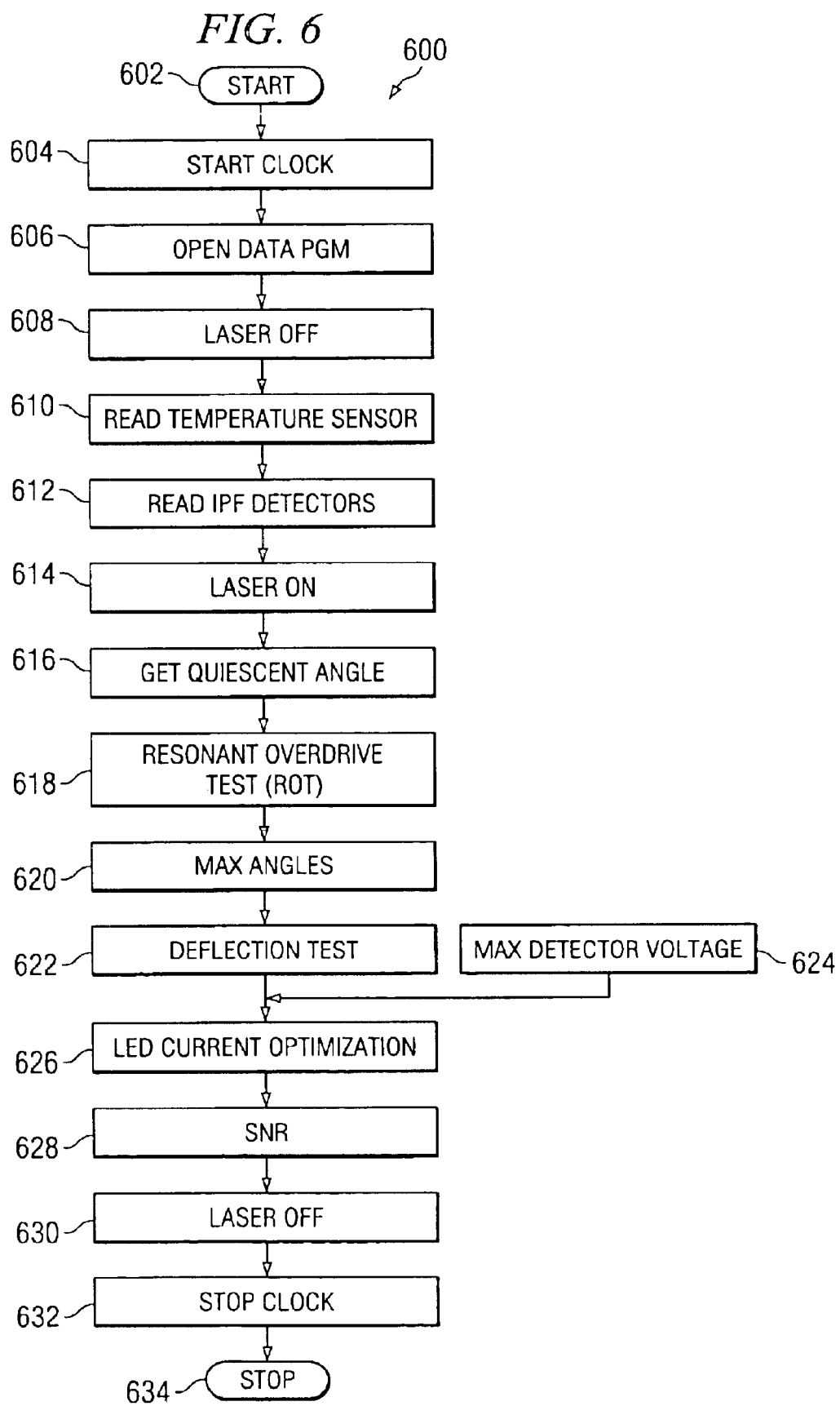

AUTOMATIC TEST SYSTEM FOR AN ANALOG MICROMIRROR DEVICE

REFERENCE TO RELATED APPLICATION

This application is related to U.S. patent application Ser. No. 10/318,684 (TI-34743) entitled "Current Driver for an Analog Micromirror Device", commonly assigned and filed on even date herewith, which is incorporated herein by reference.

FIELD OF THE INVENTION

This application relates to testing a micromirror device, and more particularly to a current driver utilized in an automatic test system for an analog micromirror device.

BACKGROUND OF THE INVENTION

Modern data communications technologies have greatly expanded the ability to communicate large amounts of data over many types of communications facilities. This explosion in communications capability not only permits the communications of large databases, but has also enabled the digital communications of audio and video content. This high bandwidth communication is now carried out over a variety of facilities, including telephone lines (fiber optic as well as twisted-pair), coaxial cable such as supported by cable television service providers, dedicated network cabling within an office or home location, satellite links, and wireless telephony.

A relatively new technology that has been proposed for data communications is the optical wireless network. According to this approach, data is transmitted by way of modulation of a light beam, in much the same manner as in the case of fiber optic telephone communications. A photo-receiver receives the modulated light, and demodulates the signal to retrieve the data. As opposed to fiber optic-based optical communications, however, this approach does not use a physical cable for transmission of the light signal. In the case of directed optical communications, a line-of-sight relationship between the transmitter and the receiver permits a modulated light beam, such as that produced by a laser, to travel without the waveguide of the fiber optic cable.

Apparatus useful for such communications links is known from U.S. Pat. No. 6,295,154, entitled "Optical Switching Apparatus", commonly assigned herewith and incorporated herein by reference. This patent discloses a micromirror assembly for directing a light beam in an optical switching apparatus. As disclosed in this patent, the micromirror assembly includes a silicon mirror capable of rotating in two axes which reflects the light beam in a manner that may be precisely controlled by electrical signals. One or more small magnets are attached to the micromirror itself; a set of four coil drivers are arranged in quadrants, and are controlled to attract or repel the micromirror magnets as desired, to tilt the micromirror in the desired direction.

Copending application Ser. No. 90/957,476 which is commonly owned and which is incorporated herein by reference provides a micromirror assembly that includes a package and method for making a package having a sensing capability for the position of the micromirror. This package and method is relatively low-cost, and well suited for high-volume production. The package is molded around a plurality of coil drivers, and their control wiring, for example by injection or transfer molding. A two-axis micromirror and magnet assembly is attached to a shelf overlying the coil drivers. Underlying the mirror is a sensor for sensing the angular position of the mirror. According to the preferred embodiment of the invention, the sensor includes a light-emitting diode and angularly spaced light sensors that can sense the intensity of light emitted by the diode and reflecting from the backside of the mirror. The position of the mirror can be derived from a comparison of the intensities sensed by the various angularly positioned light sensors.

Currently these devices are manually tested which is a time consuming procedure. Performing the necessary tests manually on a single analog micromirror device could take half a day to perform. Now that these micromirror devices will be mass produced to meet the growing demand, there is a need for an automatic test system to test the mass produced devices.

SUMMARY OF THE INVENTION

It is a general object of the present invention to provide an automatic test system for an analog micromirror device.

This and other objects and features are provided, in accordance with one aspect of the invention, by a tester for a micromirror device comprising a housing having a mounting for receiving a micromirror device. A light source is mounted to direct a light onto a micromirror device when installed in the mounting, to produce a reflected beam. A position sensitive device generates a position signal indicative of the position of the reflected beam. A computer has an output coupled to the micromirror device and to the light source and an input coupled to the position sensitive device.

Another aspect of the invention includes a method of testing a micromirror device comprising activating a light source to generate a light beam which impinges on a mirror surface of the micromirror device to produce a reflected beam which impinges on a position sensitive device. A voltage signal is applied to a current driver for generating a current signal through coils for moving the mirror which is directly proportional to the amplitude of the voltage signal and unrelated to the resistance or inductance of the coil. A position signal generated by the position sensitive device which is representative of a position of the reflected beam on the position sensitive device is detected. An angular position of the mirror surface is calculated from the detected position signal.

A further aspect of the invention comprises a method of mechanically testing a micromirror device comprising determining the resonant frequency and Q for the micromirror device. The micromirror device is excited at the resonant frequency for a predetermined time period. The resonant frequency and Q of the micromirror device are determined after excitation at the resonant frequency.

BRIEF DESCRIPTION OF THE DRAWINGS

FIG. 6 is a flow diagram for an integrated test of the micromirror device.

DETAILED DESCRIPTION OF THE PRESENT INVENTION

Figure 1:
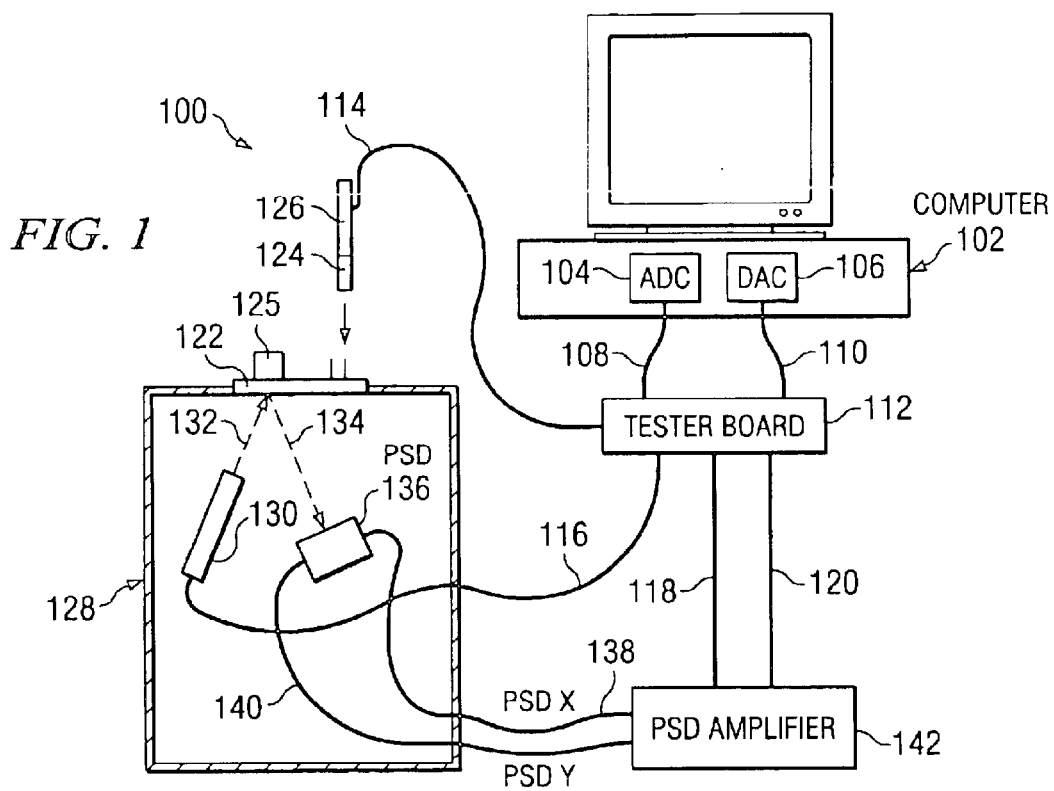
FIG. 1 is a block diagram of an automatic tester for analog micromirror device in accordance with the present invention.

FIG. 1 shows a block diagram of an automatic test system for an analog micromirror device according to the present invention generally as 100. The system comprises a computer 102 which may be a personal computer, for example. The computer has an analog to digital converter card 104 and digital to analog converter card 106 connected to the peripheral bus thereof. For example, the cards can be PCI cards made by National Instruments. The analog to digital converter card 104 is connected to a tester board 112 via cable 108 and the digital to analog converter card 106 is connected to the tester board 112 via cable 110. The micromirror device 125 is attached to a "black box" 128 via a mounting 122. The mounting 122 is designed to hold the micromirror device to the black box 128 so that the connector portion faces towards the top of the box and the micromirror device is exposed to the inside of the box via a hole in the mounting 122. The "black box" 128 is in the preferred embodiment literally a black box which has been painted with a flat black paint on the inside to minimize multiple reflections within the box which can cause improper readings. A connector 124 is connected to a handle 126 and connected via cable 114 to the tester board 112. The connector 124 connects to a mating connector on the micromirror device. A light source such as a laser diode 130 is mounted within the black box 128 to produce a light beam which impinges upon the micromirror device 125. A position sensitive device 136 is also mounted within the black box 128 so as to receive the reflected light beam 134. The position sensitive device (PSD) is a signal device having a transparent cover which generates a pair of signals at its output. One of the pair of signals represents the X coordinate of the light spot impinging upon the device and the other pair of signals represents the Y coordinates of the spot. These known devices are manufactured by UDT Sensors, Inc. and ON-TRAK, for example. The X position signal generated by PSD 136 is coupled to the PSD amplifier 142 via cable 138 and the Y coordinate signal generated by PSD is coupled to the PSD amplifier 142 via cable 140. The laser 130 is coupled to the tester board via power cable 116. The output for the X coordinates generated by the PSD amplifier 142 is coupled to the tester board via cable 118 and the output for the Y coordinates generated by the PSD amplifier 132 is coupled to the tester board via cable 120. The tester board 112 provides the interface between the ADC 104 and DAC 106 and the micromirror device under test 125, the components within the black box 128 and the PSD amplifier. In addition to providing the right connectors for the various components and for providing connections between the input and output connectors, the tester board provides a power supply to drive the laser and the LED for the sensor in the micromirror device for sensing the angular position of the mirror, as described above. The coils of the micromirror device are preferably driven by a current driver such as the current driver described in co pending application Ser. No. 10/318,684 (TI-34743) entitled "Current Driver for Analog Micromirror Device", which is incorporated herein by reference. A voltage driver circuit could be utilized in place of the current driver, but this would suffer from disadvantages described in the co pending application. The driver for the LED is also a constant current source, but is different from the constant current source utilized to drive the coils of the micromirror device because the coils require bipolar current while the LED requires current flow in only a single direction. The LED current is related to the DAC voltage and this relation may be, for example, $I_{LED}$ (mA)=5*$V_{LED}$ (volts). The laser 130 is driven by a current source designated to sink 200 mA. The circuit is similar to that for the LED current driver except that the input voltage is fixed and not controlled by the DAC.

In operation, the computer 102 runs routines to be described below to generate digital commands which are then sent along the PCI bus to the DAC 106. The digital commands are converted into an analog voltage in DAC 106 and sent via cable 110 to the tester board 112. These commands can be utilized to activate the coils of the micromirror device and the LED on the micromirror device under test (DUT) for the internal position sensing determination via cable 114 and connector 124. The commands can also be utilized to activate the laser 130 via cable 116. In response to these activations, signals are generated by the PSD 136 along lines 138 and 140 and input to PSD amplifier 142. Amplifier 142 outputs these signals on lines 118 and 120 respectively which are then coupled to the ADC via line 108. In addition, the output of the internal sensing device (not shown) on the micromirror device 125 is fed to connector 124 and via cable 114 to the tester board 112 and then on to ADC 104 via cable 108. The output of the internal sensing device and the PSD are converted by the ADC to digital values which are then stored in the memory of computer 102 and used to calculate the parameters for the micromirror device of the test. If the device under test 125 meets predetermined criteria stored with computer 102, the computer will indicated that the device has passed the test and otherwise will indicate that the device has failed the test. The computer 102 may also store statistical data for devices that are tested in order to monitor the consistency of the manufacturing process.

Before proceeding to describe the test programs run by computer 102, there are two calibration steps that are preferable before proceeding to test a device. It is possible that the test fixture 122 will vary in position in between one test station and another. It is therefore preferable to determine the quiescent mirror position which is determined by utilizing a fixed mirror in place of the device under test in determining the measured position. It is also desirable to first obtain a measure of the angle of the mirror determined using the PSD. This is determined utilizing a micromirror device having known maximum angles.

Figure 2:
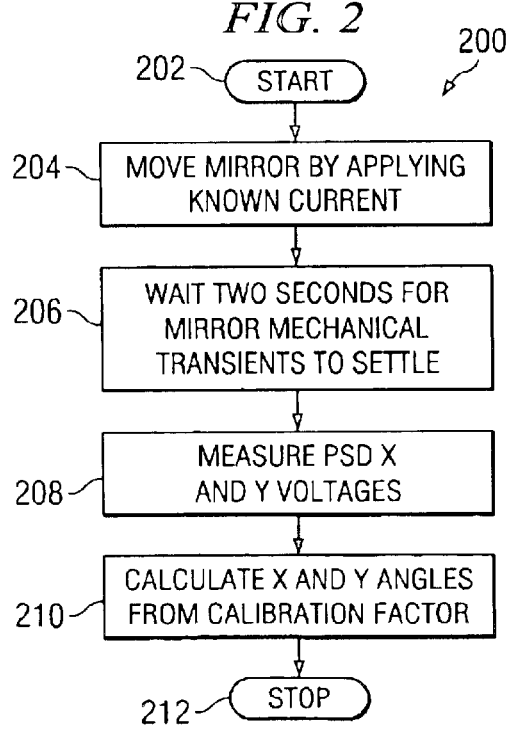
FIG. 2 is a flow chart for measuring the mirror position.

FIG. 2 shows a flow chart for a routine for measuring the mirror position of a DUT generally as 200. First, a known current is applied to the X and Y coils of the micromirror device. If is preferable that a X and a Y current driver as described in co pending application Ser. No. 10/318,684 (TI-34743) is utilized. A current driver of this form receives a voltage input signal and converts it into a known current through the coil, regardless of the resistance or inductance of the coil. This is provided in block 204. The magnetic field of the coils is determined by the current flowing there through, and thus a current drive is preferable to a voltage drive, because it generates a known magnetic force. The micromirror device is a mechanical device and thus it is preferable to wait approximately two seconds for the mechanical transients in the mirror movement to settle down before taking any measurements. This is performed at block 206.

After the mechanical transients of a mirror have settled, the PSD X and Y voltages are measured utilizing the PSD amplifier 142, the tester board connections and the ADC 104. This is performed at block 208. At block 210, the X and Y angles are calculated based on the X and Y signal output from the PSD and the calibration factor measured using a mirror with known maximum angle.

Figure 3:
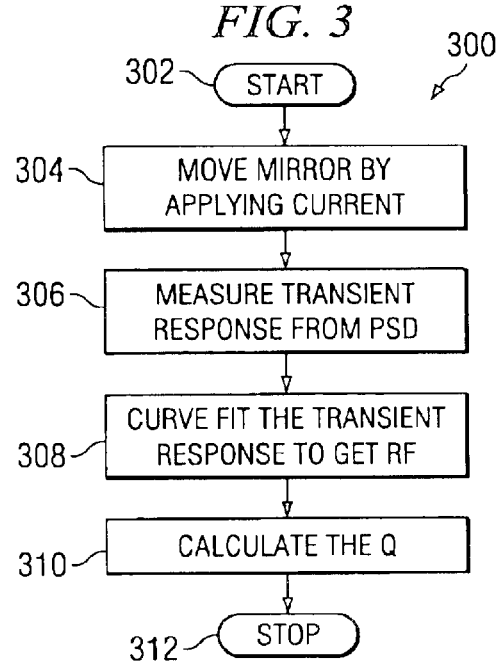
FIG. 3 is a flow chart for measuring the resonant frequency and Q of the micromirror device.

FIG. 3 shows a flow chart for measuring the resonant frequency and Q of the micromirror device generally as 300. At block 304, the mirror is moved by applying a predetermined current pulse to either the X or the Y coil. The transient response of the beam deflection is measured from the PSD at block 306. The transient response is utilized in a curve fitting routine to obtain the resonant frequency as is known in the art. This occurs at block 308. The decay of the transient response is utilized to calculate the Q of the micromirror device at block 310.

$$Q = \left(-2\pi \frac{f * tau}{2}\right)$$

where f=resonant frequency.

Figure 4:
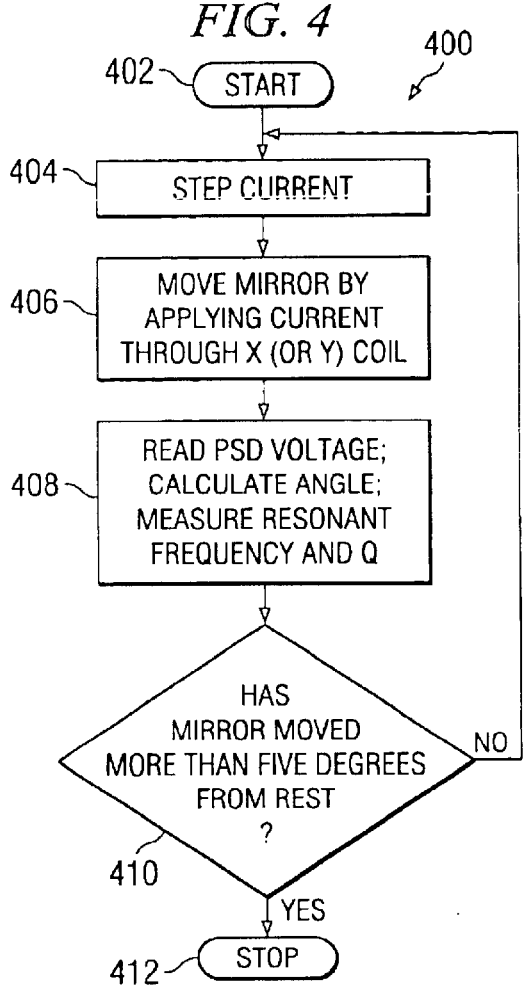
FIG. 4 is a flow chart for testing the mirror deflection.

FIG. 4 shows a flow chart for a mirror deflection test generally as 400. At block 404, the current is stepped up in value by 2 milliamps. The current drive signal is utilized to move the mirror by applying the current through the X or the Y coil. The PSD voltage is measured and utilized to calculate the angle, measuring the resonant frequency and the Q as described above. This occurs in block 408. In block 410, a determination is made if the mirror has moved more than five degrees from its rest position. If it has, the test is stopped at block 412. If it has not moved by that amount, control returns to block 404 and the current is stepped by an additional amount, for example, 2 milliamps and the test is repeated until the mirror has moved more than five degrees from its rest position. The five degree angle is chosen as this is considered the maximum usable angle for the micromirror devices currently in use. Another angle could be utilized to match characteristics of future mirrors that are produced.

Figure 5:
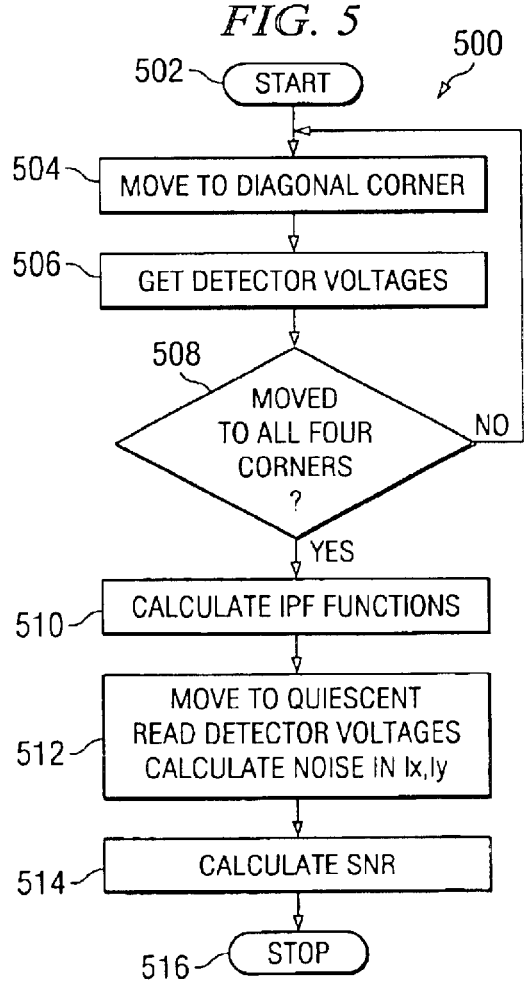
FIG. 5 is a flow chart for measuring the SNR of the IPF functions.

A method of measuring the signal to noise ratio (SNR) is shown in FIG. 5 generally as 500. The micromirror device contains an internal package feedback (IPF) apparatus which can determine the angular position of mirror in both the X and the Y directions. The IPF has four infrared detectors which measure the amount of light received from a centrally located LED. The LED and the four detectors are behind the mirror, and thus do not affect the normal operation of the mirror. The light received by the four detectors is reflected by the back of the mirror and this reflected light will vary depending upon the angle direction of the mirror. Therefore, the voltage produced by a detector will depend upon the angular position of the mirror. The fours detectors are located in the four diagonal corners of the mirror which are labeled NE (northeast), NW (northwest), SE (southeast), SW (southwest). In the equations below, these acronyms are used to depict the voltage output of the four respective detectors.

The mirror position is calculated by means of a IPF function for the X and the Y directions. These functions are:

$$IPFx=(NE-NW+SE-SW)/(NE+NW+SE+SW) \quad (1)$$

$$IPFy=(NE-SE+NW-SW)/(NE+NW+SE+SW) \quad (2)$$

To measure the SNR, the LED current is increased to the maximum possible value without saturating the detectors at any of the four diagonal locations. This value can be determined experimentally. The mirrors are moved to each of the four diagonal directions as defined below at step 504;

$Ix=IPFx$ $Iy=IPFy$

1. +5 degrees in x and +5 degrees in y (let Ix=Ix1 and Iy=Iy1)
2. −5 degrees in x and +5 degrees in y (compute Ix2 and Iy2)
3. −5 degrees in x and −5 degrees in y (compute Ix3 and Iy3)
4. +5 degrees in x and −5 degrees in y (compute Ix4 and Iy4)

The detected voltages are measured at each of the locations at step 506 and a decision is made at 508 as to whether or not all four corners have been measured. Once all four corners have been measured, the IPF functions, IPFx and IPFy are calculated at step 510 using equations 1 and 2. The range in Ix is defined as max (Ix1−Ix2, Ix4−Ix3) and Iy is defined as max (Iy1−Iy4, Iy2−Iy3).

Control test to block 512 in which the mirror is moved to its quiescent position and the detector voltages are read. The statistical 1 sigma (RMS) noise in EPX and IPFy are measured at quiescent position, when there is no current applied to the coils of the micromirror device. The statistical reading is calculated from acquiring a large number of samples. Control then passes to block 514 in which the SNR and the x and y directions are computed using equations 3 and 4:

$$SNRx \text{ } (SNR \text{ in the } x \text{ direction})=(\text{Range in } Ix)/(\text{noise in } Ix \text{ at quiescent}) \quad (3)$$

$$SNRy=(SNR \text{ in the } y \text{ direction})=(\text{Range in } Iy)/(\text{noise in } Iy \text{ at quiescent}) \quad (4)$$

FIG. 6 shows an integrated flow diagram of a process for testing an analog micromirror device according to the present invention generally as 600. In block 604 a clock utilized for measuring total test time is started. Control passes to block 606 in which a data collection program, if used, is opened so the data for each device may be stored and statistical analysis can be performed on the devices under test, if desired. At block 608, the laser is turned off which is the state that it should be in after the completion of step 630 from the previous test, because a laser is not utilized in the test performed in blocks 610 and 612. In block 610, a temperature sensor, if one is employed on the micromirror device, is read to determine if it gives a good reading of the ambient temperature. These sensors are typically provided on micromirror device in order that temperature compensation of the readings can be provided. However, if they are not utilized on a specific device, this step can omitted.

Control passes to block 612 in which the detectors utilized for the internal package feedback (IPF) are read. The purpose of this test is to determine if the detectors work. A current is applied to the LED which will not drive the detectors into saturation. The voltage at the output of each of the detectors is measured to determine if they are not in a saturated condition and that the voltage is within a predetermined range, typically 0.5 to 2.0 volts. It is also determined whether the ratio between the sensor having the maximum output and sensor having the minimum output is remaining within a predetermined range, particularly less than 2. That is, the ratio between the voltage at the sensor having the highest output of the sensor having the lowest output should be less than 2. The current applied to LED will depend upon the device that is utilized; a typical value may be 9 ma, for example.

Control passes to block 614 in which the laser 130 is turned ON. The laser should remain ON until control passes to block 628, as described below. In block 616, the quiescent angle is obtained for each micromirror device. This is done to be sure that the micromirror device is properly seated in the mounting 122. The quiescent angle for the test fixture have been previously determined using a fixed mirror or a known good device. This determines a position along the X and Y axes of the PSD which is the zero position for the fixture. With no current applied to the coils, the position in both the X and Y axes on the PSD is determined and the quiescent angle for the fixture is subtracted from each of the X and Y voltages to determine the quiescent angle for the device itself. If the value is beyond certain limits, it is determined that the device is not properly mounted. If the device is within limits, this data is utilized in subsequent tests.

Control passes to block 618 in which a resonant overdrive test (ROT) is performed. First, the resonant frequency and Q are determined utilizing the procedure shown in FIG. 3 for the mirror and the gimbals. Then the mirror is driven at the geometric mean of the gimbal and mirror resonant frequency for a period of approximately 10 seconds at a high enough current to overdrive the mirror in order to catch devices that will fail from infant mortality as a result of the stress. The drive frequency is increased for a gimbal resonant frequency to the geometric mean to reach resonant overdrive. The current used to drive the mirror at the resonant frequency may be about 2 milliamps, for example. At the end of the resonant overdrive test, the resonant frequency and Q test is performed again. The resonant frequencies observed before and after the ROT should agree very closely. If not, the device fails the ROT test. The resonant frequency in both the X and Y directions, that is for the mirror and for its gimbal, may not vary by more than 1 Hz, for example, in order to pass this test. There is also a range for resonant frequency, which varies by mirror design, in which the device must fall in order to pass the test.

Control passes to block 620 in which a maximum angular deflection test is performed in accordance with the procedure shown in FIG. 2. The amount of current provided designed to drive the mirror to its maximum angular deflection, which varies by design, but is typically 80 mA.

Control passes to block 622 in which a deflection test is performed in accordance with the procedure outlined in FIG. 4. In this test the mirror is stepped through small increments in the angular deflection until the mirror reaches ±5 degrees in both the X and Y directions, going back to zero each time. The current in step 404 may be stepped by 2 milliamps, for example.

Control then passes to block 626. Before proceeding with LED current optimization in block 626, a maximum detector voltage test is performed in block 624 in which enough current is passed through the LED to saturate the detectors. The amount of current through the LED needed to saturate the detectors varies with both the LED and detectors utilized. In one design, a current of 25 milliamps through the LED will drive the detectors to saturation. If a five volt supply is utilized for the detectors, an output voltage from the detectors in saturation should be 4.1 or 4.2 volts and at least 80 or 90 percent of this is needed to pass this portion of the test. In block 626, the LED current is set as high as possible without saturating the detectors so that the highest possible signal to noise ratio (SNR) can be determined. This is determined by stepping of the LED current until one of the detectors reaches 80 or 90 percent of the expected output voltage, such as 4.1 or 4.2 volts as described above in connection with step 624.

Control passes to block 628 in which the SNR is calculated for the IPF detectors. This procedure is outlined in FIG. 5. Once all of these tests have been completed, the laser is turned OFF in step 630 and the clock stops in step 632. The parameters that have been measured are stored in the data program, if used, and the device, if it passes the test is sent to the user.

The methods utilized to measure the parameters described in these tests are known in the art. The test can be performed using a program known as Lab VIEW version 6i and the routines necessary to perform tests such as finding the resonant frequency, the Q, and the SNR can utilize routines in that programming language.

While the invention has been particularly shown and described with reference to preferred embodiments thereof, it is well understood by those skilled in the art that various changes and modifications can be made in the invention without departing from the spirit and scope of the invention as defined by the appended claims.

What is claimed is:

1. A tester for a micromirror device comprising:
   a housing having a mounting for receiving a micromirror device;
   a light source mounted to direct a light beam onto a micromirror device when installed in the mounting, to produce a reflected beam;
   a position sensitive device for generating a position signal indicative of the position of the reflected beam; and
   a computer having an output coupled to the micromirror device and to the light source and an input coupled to the position sensitive device.

2. The tester of claim 1 wherein the housing is an optical black box and the mounting is an exterior mounting for receiving the micromirror device.

3. The tester of claim 2 wherein the light source is a laser diode mounted within the box.

4. The tester of claim 1 wherein the light source is a laser diode mounted within the box.

5. The tester of claim 1 wherein the position sensitive device generates an X position and a Y position output signal.

6. The tester of claim 1 wherein the computer is connected to micromirror device drive coils via a digital to analog converter.

7. The tester of claim 6 wherein an output of the digital to analog converter is coupled to the micromirror device drive coils via an amplifier which generates an output current proportional to an input voltage.

8. The tester of claim 1 wherein the computer is coupled to the laser via a digital to analog converter.

9. The tester of claim 1 wherein the output of the position sensitive device is coupled to an input of the computer via an analog to digital converter.

10. A method of testing a micromirror device comprising:
    activating a light source to generate a light beam which impinges on a mirror surface of the micromirror device to produce a reflected beam which impinges on a position sensitive device;
    applying a voltage signal to a current driver for generating a current signal through coils for moving the mirror which is directly proportional to the amplitude of the voltage signal and unrelated to resistance or inductance of the coil;
    detecting a position signal generated by the position sensitive device which is representative of a position of the reflected beam on the position sensitive device; and
    calculating an angular position of the mirror surface from the detected position signal; and
    determining if the angular position calculated meets predetermined criteria.

11. The method of claim 10 wherein the angular position is calculated after a time delay to allow the mirror surface of the micromirror device to settle.

12. The method of claim 10 wherein, if the mirror surface has not been moved to a maximum angular position, the amplitude of the voltage signal is incremented to drive the mirror surface to a greater angular deflection.

13. The method of claim 10 further comprising measuring a transient response of the micromirror device to the current signal;
calculating a resonant frequency of the micromirror device from the transient response.

14. The method of claim 13 further comprising measuring a decay in the transient response; and
calculating a Q of the micromirror device.

15. A method of mechanically testing a micromirror device comprising:
determining the resonant frequency and Q for the micromirror device;
exciting the micromirror device at the resonant frequency for a predetermined time period;
determining the resonant frequency and Q of the micromirror device after excitation at the resonant frequency; and
comparing the resonant frequency and Q before and after excitation of the micromirror device at the resonant frequency.

16. The method of claim 15 further comprising rejecting a micromirror device if the resonant frequency or Q after excitation at the resonant frequency has changed from a pre-excitation measurement by more than a predetermined amount.

17. The method of claim 15 wherein the micromirror device is driven at a frequency reached by incrementing the frequency from gimbal (smallest resonant frequency) to the geometric mean of mirror and gimbal resonant frequency, at a fixed current drive.

18. The method of claim 15 wherein the resonant frequency and Q are determined by pinging mirror and gimbal drive coils and calculating the resonant frequency and Q from transient response to the ping signal.

19. The method of claim 18 wherein the resonant frequency is determined from an output signal of the position sensitive device when a single pair of coils of the micromirror device are activated.

20. The method of claim 19 wherein the Q of the micromirror device is obtained from decay rate tau of the transient response utilizing the equation:

$$Q = \left(-2\pi \frac{f * tau}{2}\right)$$

where f=resonant frequency.

* * * * *